UNITED STATES PATENT OFFICE.

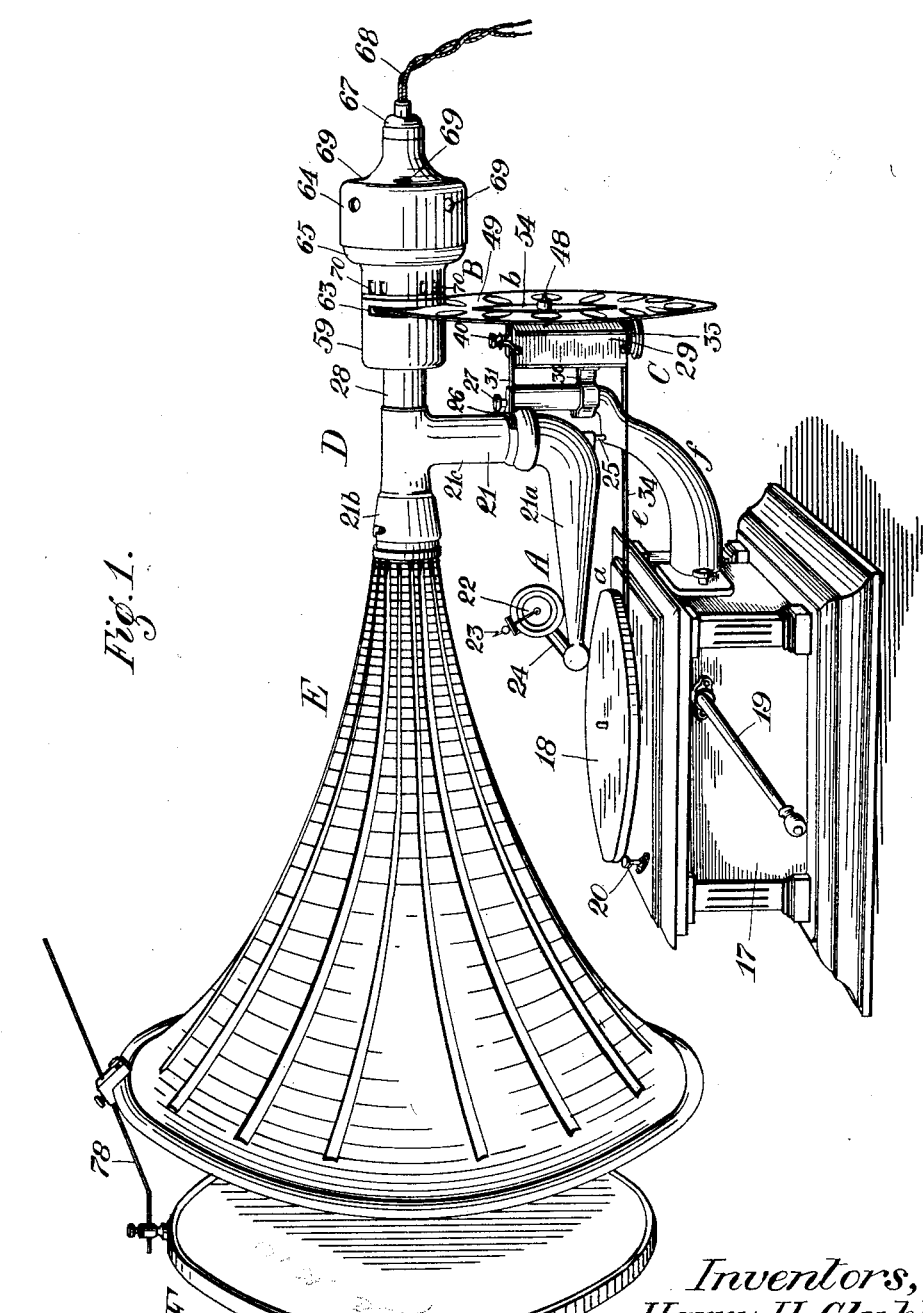

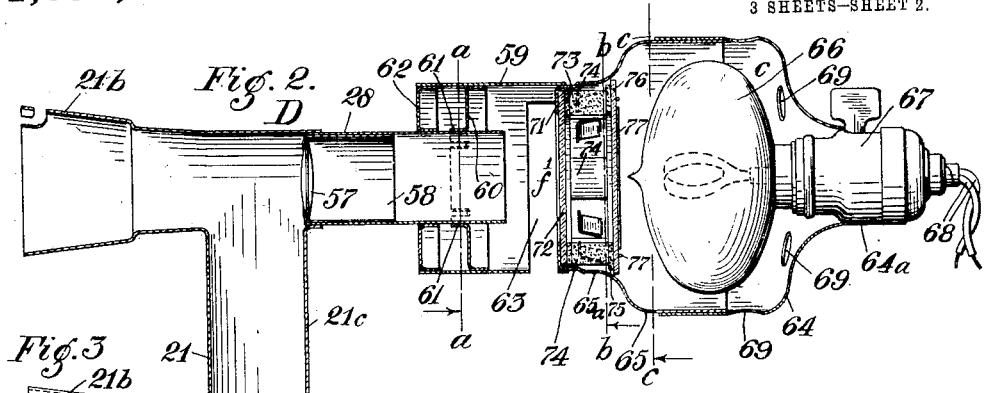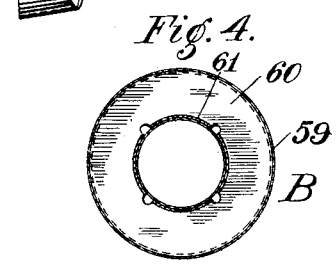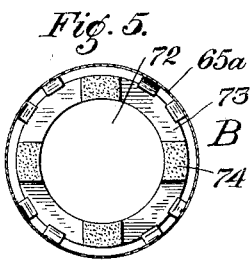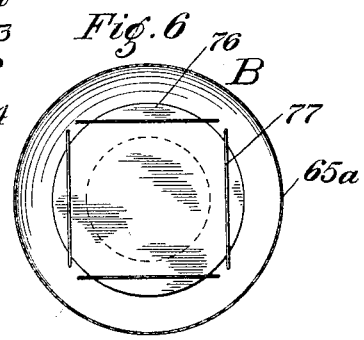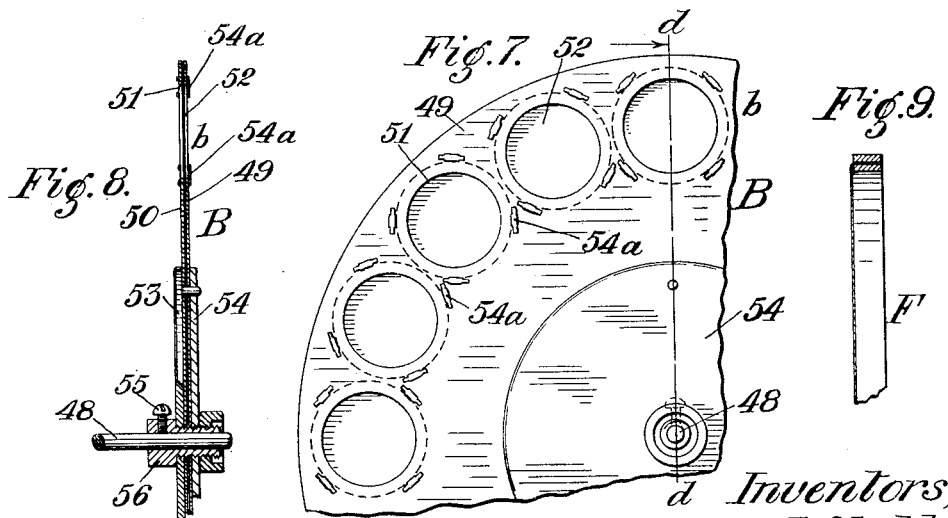

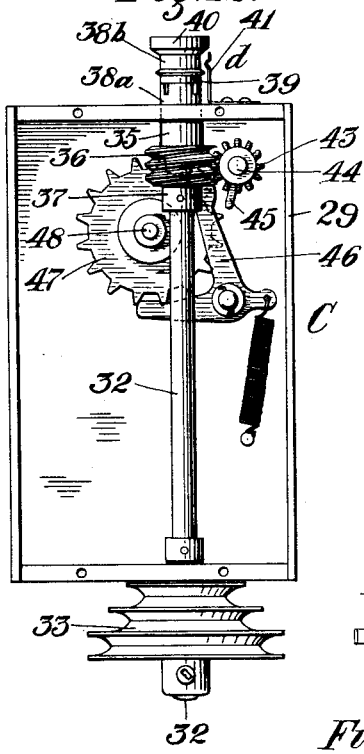

HARRY H. CLUBB AND RICHARD A. WHITEHEAD, OF LOS ANGELES, CALIFORNIA, ASSIGNORS TO PICTURE DISC COMPANY, OF LOS ANGELES, CALIFORNIA, A CORPORATION OF CALIFORNIA.

SOUND AND IMAGE PRODUCING APPARATUS.

1,094,704. Specification of Letters Patent. Patented Apr. 28, 1914.

Application filed September 22, 1910. Serial No. 583,306.

*To all whom it may concern:*

Be it known that we, HARRY H. CLUBB and RICHARD A. WHITEHEAD, citizens of the United States, residing at Los Angeles, in the county of Los Angeles and State of California, have jointly invented new and useful Improvements in Sound and Image Producing Apparatus, of which the following is a specification.

This invention has for its object to provide improvements in apparatus wherein sounds and images are produced or reproduced, either jointly or independently, and which will be superior in point of relative simplicity, inexpensiveness of construction, positiveness in operation, facility of control and adjustment and durability, and which will be generally superior in point of efficiency and serviceability to similar apparatus now in use.

The invention has for a particular object the provision of improved apparatus wherein and whereby sounds are reproduced and images are produced, jointly, preferably under joint operation, so that the display or projection of a certain image shall be synchronized with the reproduction of a certain sound or sequence of sounds.

More specifically, the invention aims at the provision of improved apparatus composite of the phonograph and allied apparatus and a suitable picture projecting or displaying means or apparatus, (the latter not of the kinetoscopic or so-called moving picture type), whereby a song, speech or other vocal rendition produced by the phonographic apparatus may be illustrated or caused to appeal to the sense of sight through picture projecting or displaying apparatus suitably operated in step with the phonographic apparatus. In a preferred method of practising the invention, the picture projecting apparatus, or a portion thereof, is supported by the tubular means of conveyance or direction of the sound waves from the sound producing agency to the amplifier or support thereof; and the pictures or images are projected through said tubular means of conveyance or direction and the amplifier, if the latter be connected therewith. The pictures or images are preferably finally displayed upon a screen suitably disposed in front of the amplifier or the tubular part leading thereto and adapted to support the same.

Suitable operative connections are provided between the sound producing means and the picture producing or projecting means, to cause the operation of the same in step; and said operative connections include means for throwing the same into or out of operation, so that the picture producing means and the sound producing means may be operated either jointly or separately, as preferred.

The picture or image projecting means comprise a suitable source of light, and means for insulating the picture record or disk from the heat attending the generation of the light.

With the above and other objects in view, and the above and fairly equivalent means of carrying the same into effect or embodiment, the invention consists in the novel provision, construction, combination, association and relative arrangement of parts, members and features, all as hereinafter described, shown in the drawings, and finally pointed out in claims.

In the drawings:—Figure 1 is a perspective view of apparatus for producing sounds and images, the same being constructed and organized according to the invention; Fig. 2 is an enlarged longitudinal sectional view, partly in full lines, taken through the tubular means for conveying or directing the sound waves from the sound producing apparatus to the amplifier, and likewise through a portion of the picture producing means; Fig. 3 is a detail fragmentary view of a portion of the tubular means shown in Fig. 2, the parts being in slightly varied position; Fig. 4 is a detail vertical sectional view, taken upon the line $a—a$, Fig. 2; Fig. 5 is a detail vertical sectional view, taken upon the line $b—b$, Fig. 2; Fig. 6 is a detail vertical sectional view, taken upon the line $c—c$, Fig. 2; Fig. 7 is an enlarged detail face view of a portion of the picture disk or record shown in Fig. 1; Fig. 8 is a detail transverse sectional view, taken upon the line $d—d$, Fig. 7; Fig. 9 is a detail fragmentary sectional view of the screen shown in Fig. 1, and upon which the pictures or images are displayed; Fig. 10 is a top plan view of the major portion of the operative connections between the sound producing means and the picture producing means shown in Fig. 1; Fig. 11 is a view of the parts and features shown in Fig. 10, a side member of the casing being removed, and the view being in elevation; Fig. 12 is a view similar to Fig. 11, but taken at right angles thereto, the front member of the casing being removed; Fig. 13 is a detail fragmentary view of a part of the construction shown in Figs. 11 and 12, the same being shown in an altered condition, or with the parts relatively moved; Fig. 14 is a transverse sectional view taken upon the line $e$—$e$, Fig. 13; Fig. 15 is a detail fragmentary view, partly in section, of a part of the construction shown in Figs. 11 and 12; and Fig. 16 is a top plan view of a portion of the construction shown in Fig. 15.

Corresponding parts in all the figures are denoted by the same reference characters.

Referring with particularity to the drawings, A designates sound producing or reproducing apparatus, B designates picture producing or reproducing apparatus, C designates operative connections between the means or members A and B, D designates tubular means for conveying sound from the sound producing apparatus to the amplifier E and for likewise supporting the picture producing or reproducing means B, which latter, as well as certain features of the picture projecting means are mounted upon the tubular means or member D.

F designates a screen upon which the pictures produced or reproduced are displayed, $a$ designates the sound record actuating member of the means A, and $b$ designates the picture record which may be driven or actuated in step or jointly therewith through the agency of the operative connections C.

The picture projecting means B include a source of light $c$, the rays of which are directed upon successive portions of the picture record $b$ to produce images which are projected through the tubular means D and displayed upon the screen F; the light rays carrying the successive images passing through the amplifier E in common with the sound waves, when such amplifier is employed.

The operative connections C are provided with a member $d$ for throwing the same into or out of operation; and with suitable transmission means $e$ extending to the means $a$ for actuating the sound record; the operative connections C being mounted upon the bracket $f$ which constitutes the means for supporting the tubular means or member D.

$f^1$ designates insulating means between the picture record $b$ and the source of light $c$.

A particular provision, form, construction and combination of parts, members and features embodying the invention, as shown in the drawings and above briefly discussed is as follows:—17 designates the casing of phonographic apparatus, containing the motor which drives the table 18 upon which rests the sound record; 19 designating the crank for winding the motor; and 20 designating the speed regulator controlling the operation of the motor. All of these parts, as well as the bracket $f$ connected with the casing 17, are of conventional form and construction, as are the tubular body 21 of the tubular means D for conducting the sound waves to the amplifier E, the tubular arm $21^a$, the diaphragm 22, the needle 23, and the tubular arm 24, which carries the diaphragm and the needle and is pivotally mounted upon the tubular arm $21^a$, which latter is pivotally mounted upon the bracket $f$, as at 25. At the upper end of the bracket $f$ is provided the usual yoke 26 which is held upon the bracket by the thumb screw 27, and which holds the tubular body 21 to the tubular arm $21^a$. The picture producing means B are provided with a tubular body 28 which has a slip-joint connection with the tubular body 21, at the upper end thereof, such tubular body 28 having its longitudinal axis in alinement with that of the amplifier tubular connection $21^b$, which constitutes part of the tubular body 21, and is directed substantially at right angles to the portion thereof which communicates directly with the tubular arm $21^a$. The tubular connection $21^b$ and the tubular body 28 form the cross arm of a T of which the major portion of the tubular body 21, as at $21^c$, constitutes the stem.

The major portion of the operative connections C are inclosed within a casing 29 which is adjustably connected with the upper end of the bracket $f$ by lower spring jaws 30 and an upper yoke 31, the latter of which engages with the lower end of the tubular body 21, and is held in such engagement, in common with yoke 26, by the thumb screw 27.

Within the casing 29 is disposed a vertical spindle 32 mounted rotatably therein, the lower end of said spindle projecting beneath the casing and carrying a change-speed or multiple pulley 33 about which plays a cord or belt or band 34 extending to the rotating table 18 for actuating the picture disk, and thus constituting the transmission means $e$. Loosely mounted upon and surrounding the spindle 32 is a sleeve 35 the lower portion of which is integral with a worm 36 which rests upon a collar 37 fixed to the spindle 32. The sleeve 35 projects above the casing 30, being slightly reduced in diameter to bear against the under surface of the top of the casing and acting as a stop confining the sleeve and worm to working position. The upper end of the sleeve 35 is formed into a clutch member 38ª, of which the other member 38ᵇ is slidably mounted upon the upper end of the spindle 32, being splined thereto by a pin 39, and terminating in a finger piece 40; the two clutch members 38ª and 38ᵇ constituting the means $d$ for throwing the operative connections C into or out of operation. A bent leaf spring 41 co-acts with a flange 42 upon the clutch member 38ᵇ, serving to hold the clutch members disconnected, or to permit the same to be moved into connection each with the other. The worm 36 meshes with a pinion 43 journaled upon a shaft 44 within the casing 29, said shaft being provided with a finger 45 which co-acts with a spring controlled detent 46, which, in turn, controls the movement of a gear wheel 47; and each complete revolution of the shaft 44 causes the finger 45 to actuate the detent 46 to release the gear 47, said gear being actuated through an angle equal to twice the angular pitch of the teeth thereon, by the finger 45, as the detent is withdrawn from the gear. Immediately after the actuation of the gear described, the detent again engages with the gear, and the gear is locked until another revolution of the shaft 44 has been caused by the worm 36 and the pinion 43. The gear 47 is fixed upon a picture-record shaft 48 which is journaled in the casing 29 and projects rearwardly therefrom to carry the picture record $b$; and it will be manifest that from the above construction and operation of parts the picture-record shaft 48 is intermittently rotated by the gear 47, the pinion 43, the worm 36, and the belt or band 34, in the operation of the sound record table 18; and that between rotative movements the shaft 48 is locked against movement by the detent 46. The parts and features just described, as mounted within and projecting from the casing 29, constitute, together with the belt or band 34, the operative connections C.

The picture record $b$ comprises two circular flat disk portions 49 and 50, which are provided with a plurality of registering, preferably circular openings 51 arranged adjacent to the peripheries of the two disk portions, and between which disk portions is disposed one or more picture films or sheets 52, upon which are arranged a plurality of pictures or image-forming symbols or characters or impressions or representations, the same being arranged respectively in registration with the openings 51, so as to be read therethrough. The film 52 and the disk portions 49 and 50 are bound together in flat serial relation by clamp members 53 and 54, the entirety being centered and held upon the shaft 48 by a binding screw 55 or the equivalent connected with a hub 56 upon which the clamp members 53 and 54 are threaded. Suitable flexible clips 54ª are passed through the film 52 and the disk portions 49 and 50 adjacent to the openings 51, further binding the parts closely together. Within the forward end of the tubular body 28 is disposed a lens 57 held therein by a bushing 58; and a tubular socket 59 is detachably mounted upon the rearward end of the tubular body 28 by an annular internal disk 60 having a split flange 61 embracing the tubular body 28. Forward of the disk 60 a flanged annulus 62 surrounds the tubular body 28, and bears upon the outer surface thereof and within the inner surface of the socket 59. The socket 59 is cut away transversely to form a chamber 63 traversed by successive portions of the picture record $b$, in the rotation of the same, so that the pictures in the openings 51 may be successively presented in registration with the inner end of the tubular body 28. A shell or casing consisting of two parts, 64 and 65, having slip-joint connection, incloses the source of light $c$, which comprises an incandescent bulb 66 and keyed socket 67 therefor, the latter being suitably supplied with electricity conductors 68. One of the parts, 64, may be provided with a plurality of ventilation openings 69 to permit radiation of heat from within the shell or casing. The socket 67 is installed within a neck 64ª at the rearward end of the casing part 64; and the forward end of the casing part 65 is provided with a neck 65ª which has a slip-joint connection with the rearward end of the socket 59, immediately rearward of the chamber 63. The neck 65ª is provided with a plurality of vents 70, formed by slitting and bending inwardly the stock of which the casing part 65 is formed; and the forward end of the neck 65ª is bent or spun inwardly to form an annular seat 71 for a transparent or translucent plane body 72, of glass or other suitable material. Upon the rearward face and at the edge portion of the body 72 is disposed a ring 73, rearwardly from which project a plurality of spaced heat insulating bodies 74, which contact with a ring 75 against which is placed a translucent or transparent plane body 76, there being thus formed a cooling chamber between the bodies 72 and 76, with which chamber the vents 70 communicate.

Rectangularly extended wires or similar devices 77 are extended across the rearward face of the plane body 76 and connected at their ends with the neck 65ª, serving as holding devices to maintain the body 76, the body 72, and the intermediate parts above mentioned in position within the neck. The body 72 is preferably translucent glass, and the body 76 transparent glass. The light from the bulb 66 shines through the glass bodies 72 and 76, across the chamber 63 through the picture film 52, into the rearward end of the tubular body 28, whence it traverses the lens 57 and the horizontal cross arm at the upper end of the T shaped tubular body 21, and the tubular holding means 21ᵇ for the amplifier E. The screen F is preferably suspended from the rim of the amplifier E by an adjustable rod 78.

The operation, method of use and advantages of the improved apparatus for producing sounds and images or pictures, or reproducing the same, will be readily understood from the foregoing description, taken in connection with the accompanying drawings and the following statement:—With the parts in the positions shown in the drawings, with the exception of Fig. 15, in which the detent 46 is shown as withdrawn from the gear 47, rotation of the sound record table 18 will cause rotation of the spindle 32 through the belt or cord 34, and thereupon rotation of the pinion 43 will be caused, when the clutch members 38ᵃ and 38ᵇ are in connection, the same being shown disconnected to permit the spindle to run free, in Fig. 13. Rotation of the pinion 43 causes intermittent release and actuation of the gear 47, each actuation of the gear 47 causing sufficient rotation of the picture-record shaft 48, to remove one opening 51 and its picture record 52 from the display chamber 63 in the socket 59, and move another such opening and its picture into position in said chamber. The pictures are thus successively displayed, and the subject matter of each of the same is related to the subject matter of the song, story or other sound formations being produced or reproduced by the phonograph or similar device and emitted through the tubular means D, and the arm 21ᵃ, including tubular body 21. Thus, rays of light to form a picture upon the screen F are projected through the tubular body 21 or the tubular means of communication D, which shall form a picture with subject matter related to the sounds which are being emitted by the tubular means D at the time such pictorial formation is being presented.

The record portions 52 of the picture record $b$ being preferably formed upon a carrier of celluloid or similar inflammable material, the same would become burned or scorched were it not for the provision of the cooling chamber between the glass bodies 72 and 77, which cooling chamber communicates with the ventilation openings or vents 70; and the transparent glass 77, which receives the direct heat rays from the bulb 66, is insulated from the translucent glass 72 by the insulating bodies 74.

The shell comprising the parts 64 and 65 and the necks 64ᵃ and 65ᵃ, with inclosed parts, may be readily disconnected from the socket 59; and, with said socket may be readily disconnected from the tubular body 28, which may also be readily disconnected from the tubular body 21 of the tubular means D through which both light waves and sound waves are directed and projected; and all of said parts of the picture projecting means may be connected with the tubular means D, which is present in conventional or standard phonographic apparatus, with but slight alteration of the latter, sufficient to form the slip-joint between the tubular bodies 28 and 21. Likewise, the casing 29 and its connected and contained parts, may be readily detached from the bracket $f$ or attached thereto, by means of the spring jaws 30 and the yoke 31. The belt 34 may be caused to operate the spindle 32 at the desired speed by shifting it on the multiple pulley 33. By raising or lowering the finger piece 40 upon the clutch member 38ᵇ, the worm 36 and the parts operated thereby, including the picture record, may be thrown either out of, or into operation, so that the sound producing apparatus may be operated independently of or in conjunction with the picture producing apparatus. It will be understood that the picture producing apparatus may likewise be operated independently of the sound producing apparatus, and driven or actuated in any suitable manner for the display and projection of pictorial subjects.

The provision of picture projecting apparatus mounted in connection with tubular means for conducting and directing sound waves, as hereinabove described, is particularly claimed in an application for Letters Patent filed by one of us, Harry H. Clubb, December 6, 1909, Serial No. 531,715.

We do not desire to be understood as limiting ourselves as to the specific provision, construction, formation, combination, association and relative arrangement of parts, members and features shown and described; but reserve the right to vary the same, in adapting the improvements to varying conditions of use, without departing from the spirit of the invention and the terms of the following claims.

Having thus described our invention we claim and desire to secure by Letters Patent:—

1. In apparatus of the character set forth, operative connections between means for producing vocal and instrumental renditions and means for successively displaying pictorial representations, whereby one of said means is operated in the operation of the other of said means; said operative connections comprising a driven shaft, a drive shaft, a worm, a clutch between the drive shaft and the worm, a gear upon the driven shaft, a detent controlling the gear, a pinion meshing with the worm, a finger rotated by the pinion and disposed in position to intermittently release the gear from the detent and actuate the gear; and means for operating the drive shaft.

2. In apparatus of the character described, a shaft for a picture record and means for intermittently rotating the shaft; said means comprising a gear upon the shaft, a detent controlling the movement of the gear, a pinion, a finger rotated by the pinion to intermittently release the gear from the detent and rotate the gear, a worm meshing with the pinion, and means for rotating the worm.

3. In apparatus of the character described, a shaft for a picture record, a gear upon the shaft, a detent controlling the movement of the gear, a pinion provided with a finger operated to intermittently release the gear from the detent and actuate the gear, a worm meshing with the pinion, a drive shaft, a clutch between the worm and the drive shaft, and means for rotating the drive shaft.

4. In apparatus of the character described, a shaft for a picture record, a gear upon the shaft, a detent controlling the movement of the gear, a pinion provided with a finger operated to intermittently release the gear from the detent and actuate the gear, a worm meshing with the pinion, a drive shaft, a clutch between the worm and the drive shaft, and means for rotating the drive shaft; said drive shaft being provided with change speed means.

5. Apparatus for reproducing vocal and instrumental renditions provided with a tubular body through which the sound waves are emitted, and means for successively displaying pictorial representations through said tubular body; said means comprising a socket for connection with said tubular body and provided with a cut-away portion adapted to receive a picture record entering said cut-away portion in said socket, and lighting means for passing light rays through said picture record and said socket and said tubular body.

6. Apparatus for reproducing vocal and instrumental renditions provided with a tubular body through which the sound waves are emitted, and means for successively displaying pictorial representations through said tubular body; said means comprising a socket for connection with said tubular body and provided with a cut-away portion adapted to receive a picture entering said cut-away portion in said socket, and lighting means for passing light rays through said picture record and said socket and said tubular body; there being spaced translucent bodies between said lighting means and said cut-away portions in said socket.

7. In apparatus of the character set forth, operative connections between sound reproducing means and picture projecting apparatus, said operative connections including a driven shaft connected to the picture projecting apparatus, a drive shaft connected to the sound reproducing means, a gear upon the driven shaft, a detent controlling the gear, an intermediate shaft having an operative connection with the drive shaft, and a finger carried by the intermediate shaft and adapted to intermittently release the gear from the detent and actuate the gear to produce a step by step rotary movement of the driven shaft.

8. In apparatus of the character set forth, operative connections between sound reproducing means and picture projecting apparatus, said operative connections including a driven shaft connected to the picture projecting apparatus, a drive shaft connected to the sound reproducing means, a worm driven by the drive shaft, an intermediate shaft, a pinion upon the intermediate shaft meshing with the worm, a gear upon the driven shaft, a detent controlling the gear, and a finger carried by the intermediate shaft for intermittently releasing the gear from the detent and actuating the gear to produce a step by step rotary movement of the driven shaft.

In testimony whereof, we have signed our names to this specification in the presence of two subscribing witnesses.

HARRY H. CLUBB.
RICHARD A. WHITEHEAD.

Witnesses:
C. P. WARDEN,
B. J. BLAKESLEE.

---

Copies of this patent may be obtained for five cents each, by addressing the "Commissioner of Patents, Washington, D. C."